(12) United States Patent
Ström

(10) Patent No.: US 8,571,339 B2
(45) Date of Patent: Oct. 29, 2013

(54) VECTOR-BASED IMAGE PROCESSING

(75) Inventor: Jacob Ström, Stockholm (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 698 days.

(21) Appl. No.: 12/594,628

(22) PCT Filed: Mar. 11, 2008

(86) PCT No.: PCT/SE2008/050267
§ 371 (c)(1),
(2), (4) Date: Oct. 5, 2009

(87) PCT Pub. No.: WO2008/123822
PCT Pub. Date: Oct. 16, 2008

(65) Prior Publication Data
US 2010/0129000 A1    May 27, 2010

Related U.S. Application Data

(60) Provisional application No. 60/907,493, filed on Apr. 4, 2007.

(51) Int. Cl.
*G06K 9/00* (2006.01)
*G06K 9/36* (2006.01)
*G06K 9/46* (2006.01)

(52) U.S. Cl.
USPC ............................ 382/243; 382/233; 382/251

(58) Field of Classification Search
USPC ................... 382/233, 243, 251, 253
See application file for complete search history.

(56) References Cited

U.S. PATENT DOCUMENTS

| 5,361,323 | A | * | 11/1994 | Murata et al. | 704/201 |
|---|---|---|---|---|---|
| 5,956,431 | A | * | 9/1999 | Iourcha et al. | 382/253 |
| 6,400,370 | B1 | | 6/2002 | Lee et al. | |
| 7,263,243 | B2 | * | 8/2007 | Chen et al. | 382/294 |
| 2002/0138256 | A1 | * | 9/2002 | Thyssen | 704/220 |
| 2003/0012446 | A1 | * | 1/2003 | Thomas et al. | 382/253 |
| 2003/0133515 | A1 | * | 7/2003 | Kondo | 375/295 |
| 2004/0081356 | A1 | * | 4/2004 | Shimizu et al. | 382/166 |

(Continued)

FOREIGN PATENT DOCUMENTS

| EP | 0 488 803 B1 | 1/1997 |
|---|---|---|
| JP | 4-212999 A | 8/1992 |

(Continued)

OTHER PUBLICATIONS

Ström et al. ("ETC2: Texture compression using invalid combination," Graphics Hardware, 2007, 7 pages).*

(Continued)

*Primary Examiner* — Yubin Hung
(74) *Attorney, Agent, or Firm* — Nixon & Vanderhye, P.C.

(57) ABSTRACT

A block of image elements is compressed by determining a parameter representative of a size of a bounding section in vector space encompassing feature vectors associated with the image elements. This size parameter is used to provide a deterministic, pseudo-random pattern of multiple representation vectors encompassed by the bounding section. A vector among multiple representation vectors is selected as representation of the feature vector of an image element. An identifier associated with selected vector is assigned to the image element and included in the compressed block which also comprises representations of the size parameter.

20 Claims, 8 Drawing Sheets

(56) References Cited

U.S. PATENT DOCUMENTS

| | | |
|---|---|---|
| 2004/0130552 A1 | 7/2004 | Duluk, Jr. et al. |
| 2005/0195905 A1* | 9/2005 | Kowalski .................... 375/260 |
| 2007/0071333 A1* | 3/2007 | Strom et al. ................ 382/239 |

FOREIGN PATENT DOCUMENTS

| | | |
|---|---|---|
| JP | 7-111456 A | 4/1995 |
| WO | WO 99/04368 | 2/1999 |
| WO | WO 2005059836 A1 * | 6/2005 |
| WO | WO 2005059839 A1 * | 6/2005 |
| WO | WO 2006/126949 | 11/2006 |
| WO | WO 2007/084062 | 7/2007 |
| WO | WO 2007/123452 | 11/2007 |

OTHER PUBLICATIONS

Beers et al. ("Rendering from compressed textures," Proceedings SIGGRAPH on Computer Graphics and Interactive Techniques, 1996, pp. 373-378).*

Qasem, Mohamed ("Vector Quantization," http://www.geocities.com/mphamedqasem/vectorquantization/vq.html, Dec. 29, 2003 accessed).*

Japanese Office Action issued in Application No. 2010-502058 dated May 8, 2012.

ATI™ Radeon™ X800 3Dc™ White Paper Web download. Pub. date not available. http://www.ati.com/products/radeonx800/3DcWhitePaper.pdf.

International Preliminary Report on Patentability mailed Oct. 15, 2009 in corresponding PCT Application No. PCT/SE2008/050267.

International Search Report for PCT/SE2008/050267, mailed Jul. 24, 2008.

Written Opinion of the International Searching Authority for PCT/SE2008/050267, mailed Jul. 24, 2008.

Japanese Office Action mailed Oct. 15, 2012 in Japanese Patent Application No. 2010-502058 and English translation.

Heidemann et al, "Efficient Vector Quantization Using the WTA-Rule with Activity Equalization", Neural Processing Letters, vol. 13, No. 1, 2001, pp. 1-14.

Ono et al, "Basic Technology of International Standard Image Encoding", first edition, Corona Publishing Co., Ltd, Marych 20, 1998, pp. 98-109.

Natsui et al, "Vector Quantization for Image Using Both a Specific Codebook and a Universal Codebook", Technical Report of Information Processing Society of Japan, vol. 2000, No. 116, (2000-AVM-31), Information Processing Society of Japan, Dec. 15, 2000, pp. 97-102.

NHK Science & Technology Research Laboratories, "Digital Broadcast Technologies Dictionary for Multimedia Age", MARUZEN Co., Ltd. Jun. 10, 1994, pp. 202-203.

\* cited by examiner

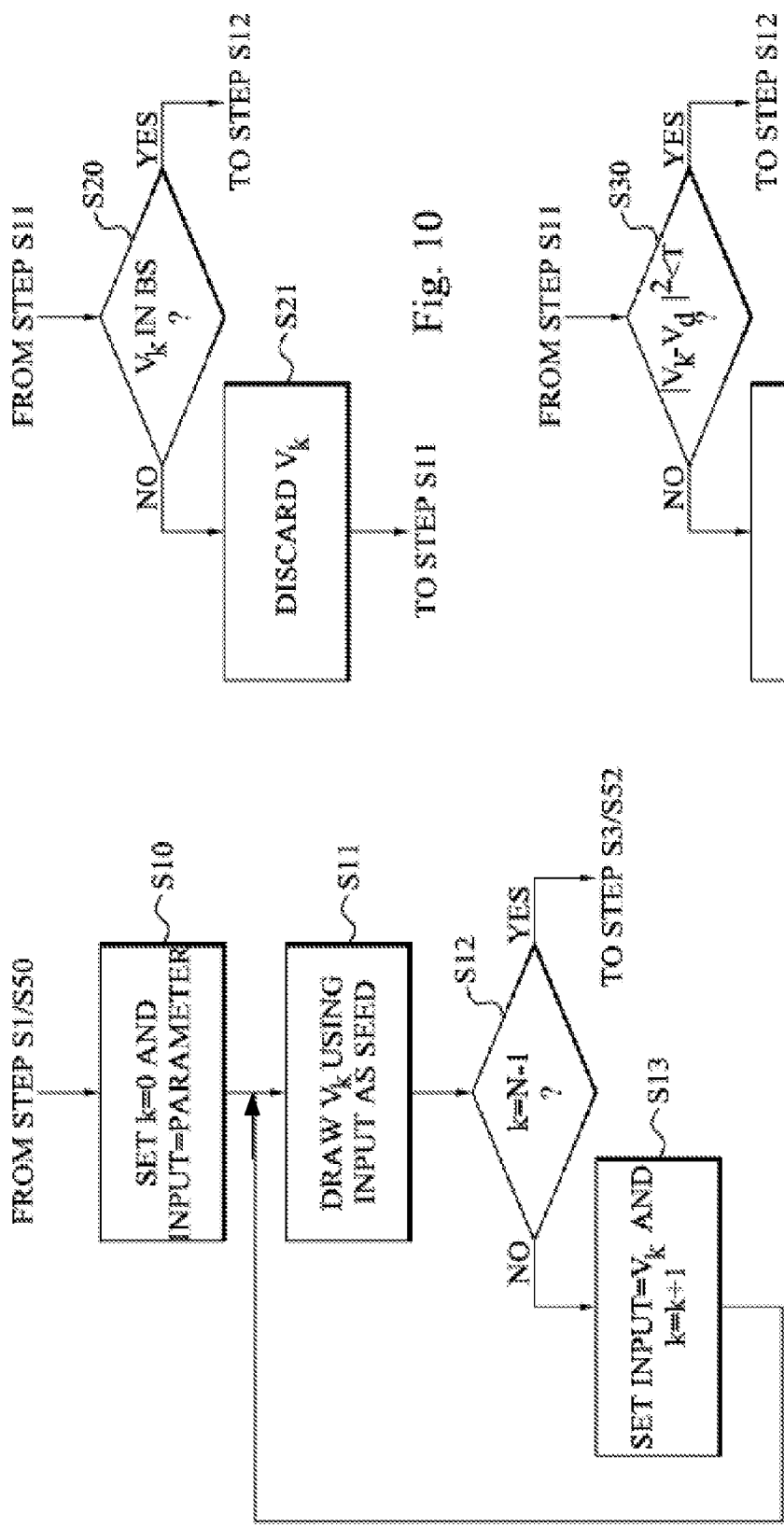

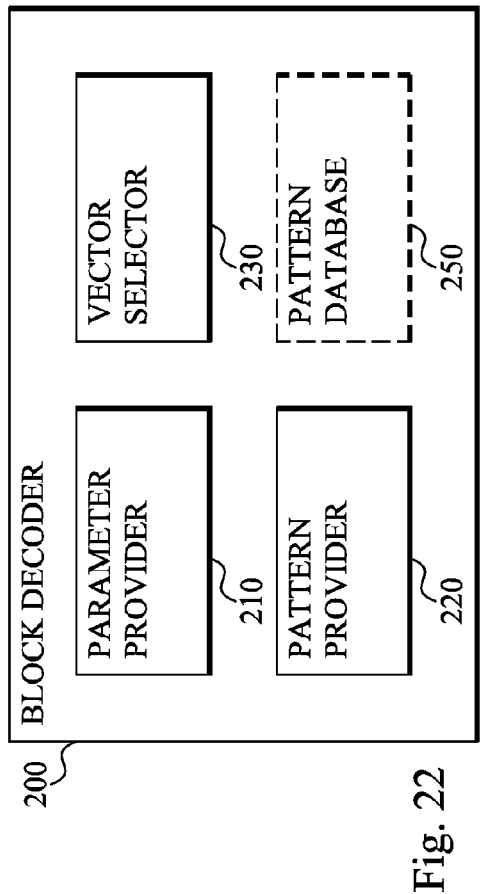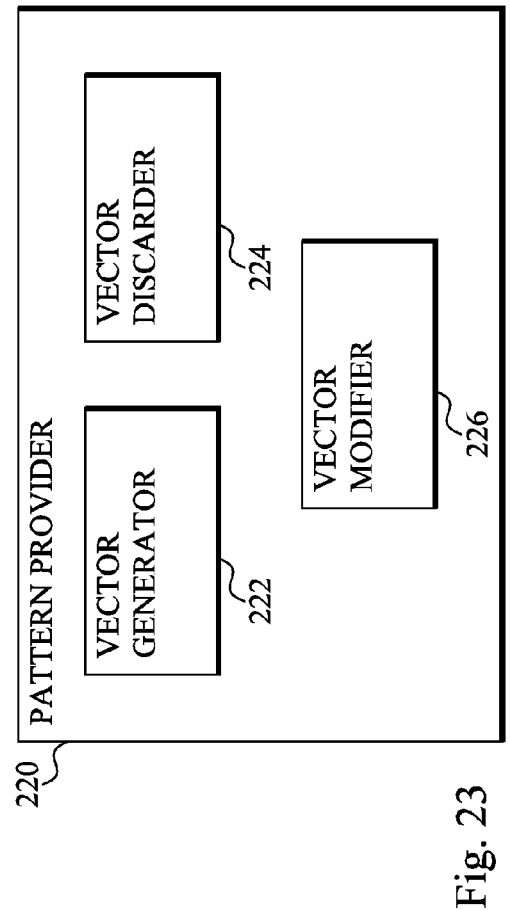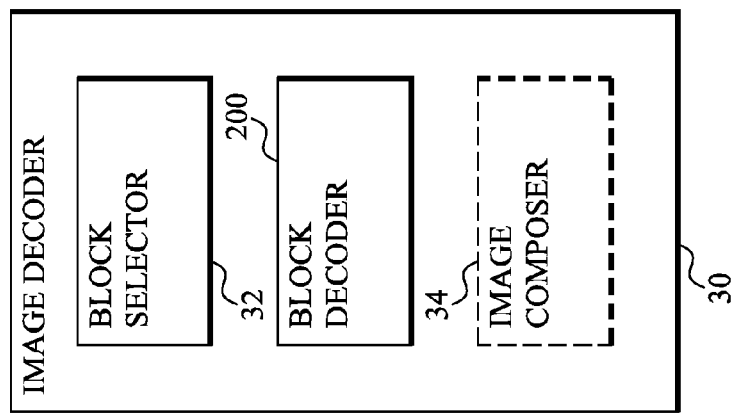

VECTOR-BASED IMAGE PROCESSING

This application is the U.S. national phase of International Application No. PCT/SE2008/050267 filed 11 Mar. 2008, which designated the U.S., and claims the benefit of U.S. Provisional Application No. 60/907,493 filed 4 Apr. 2007, the entire contents of which are hereby incorporated by reference.

TECHNICAL FIELD

The present invention generally relates to compressing and decoding images, and in particular to compressing and decoding blocks of feature vectors.

BACKGROUND

The real-time rendering of three-dimensional graphics has a number of appealing applications on mobile terminals, including games, man-machine interfaces, messaging and m-commerce. Since three-dimensional rendering is a computationally expensive task, dedicated hardware must often be built to reach sufficient performance. Innovative ways of lowering the complexity and bandwidth usage of this hardware architecture are thus of great importance.

The main bottleneck, especially for mobile phones, is memory bandwidth. A common technique for reducing memory bandwidth usage is texture compression. Texturing refers to the process of "gluing" images (here called textures) onto the rendered triangles. If the textures are compressed in memory, and then during accessing they are decompressed, a significant amount of bandwidth usage can be avoided.

Most texture compression schemes are concentrating on image-type data, such as photographs. However, with the advent of programmable shaders, textures have started to be used for many other types of data than just traditional photographic images. Bump mapping has therefore become a widespread technique which adds the illusion of detail to geometrical objects in an inexpensive way. More specifically, a texture, called a bump map or normal map, is used at each pixel to perturb the surface normal. A common approach to generate normal maps is to start with a high polygon count model and create a low complexity model using some geometrical simplification algorithm. The "difference" between these two models is then "baked" into a normal map. For real-time rendering, the normal map is applied to the low complexity model, giving it a more detailed appearance. For instance, the document [1] shows how it is possible to go from a very high triangle-count model (15 000 polygons) to a very low one (1 000 polygons) with preserved quality by using normal maps.

To be able to use lower polygon-count models is of course very attractive for mobile devices and terminals, since they have lower computational performance than PC systems.

In the majority of cases today, bump mapping is performed in local tangent space (X, Y, Z), of each rendering primitive, e.g. a triangle. Since the length of the normal is not of interest, unit normals can be employed. Thus, the problem is to compress triplets (X, Y, Z), where $X^2+Y^2+Z^2=1$. The simplest scheme, is just to treat X, Y, Z as RGB (Red, Green, Blue) and compress it with S3TC/DXT1 [2], but that gives rather bad quality.

Actually, for smooth surfaces it turns out that even uncompressed RGB888/XYZ888 does not give enough quality for some objects. Especially for smooth surfaces, more than eight bits are needed. Therefore ATI Technologies developed 3Dc [1], which is a compression format that will often allow higher quality than XYZ888.

In 3Dc only X and Y are compressed, and Z is calculated using equation 1:

$$Z = \sqrt{1-X^2-Y^2} \qquad (1)$$

X and Y are compressed separately. The X-values are grouped into blocks of 4×4 pixels. These values can range from −127.000 to +127.000, (or alternatively, from 0 to 255), but they are often clustered in an interval. 3Dc takes advantage of this and specifies this value using 16 bits: eight bits for the start of the interval and eight bits for the end of the interval.

Inside this interval, each value is specified using 3 bits each. This means that eight reconstruction levels within the interval are possible. The reconstruction levels are always equispaced (evenly spaced) in the X-direction and equispaced in the Y-direction. However, the distance between such reconstruction level in X-direction is, though, typically different from the corresponding distance in the Y-direction. This usage of a grid of reconstruction levels having different resolutions in the two perpendicular directions/axis is though not always a good representations of the original normals of blocks to be compressed.

SUMMARY

The present invention overcomes these and other drawbacks of the prior art arrangements.

It is a general object of the present invention to provide efficient block encoding/compressing and block decoding/decompressing methods and systems.

This and other objects are met by the invention as defined by the accompanying patent claims.

Briefly, the present invention involves the present invention involves image processing in the form of compressing (encoding) an image and decompressing (decoding) a compressed (encoded) image.

According to the invention, an image to be compressed is decomposed into a number of blocks comprising multiple image elements (pixels, texture elements, texels, or volume elements, voxels). Each image element in a block is characterized by a feature vector, having two or three feature vector components. The image blocks are then compressed.

The compression involves determining at least one parameter representative of a size of a bounding section in vector space. This bounding section encompasses at least a portion of the feature vectors in the block to be compressed. The at least one size parameter is used to provide a deterministic, pseudo-random pattern of N multiple representation vectors. Also these vectors are encompassed by the bounding section in feature vector space. An image element of the block is encoded by selecting a vector among the multiple representation vectors of the provided pattern as representation of the feature vector of the image element. This selection is furthermore performed based on the feature vector of the image element. A vector identifier associated with the selected vector is assigned to the image element. The compressed or coded block therefore comprises representations of the at least one size parameter and a sequence of vector identifiers.

The compressed block is decompressed or decoded by providing the at least one size parameter from the compressed block. The deterministic, pseudo-random pattern of multiple representation vectors for the current image is provided or re-created based on the provided size parameter(s). An image element is decoded by using its assigned vector identifier provided in the compressed block to select a vector among the multiple representation vectors as decoded representation of the feature vector of the image element.

The present invention also relates to a block compressor/encoder and a block decompressor/decoder.

The invention provides an efficient coding of blocks where the vector representations of the original feature vectors are not limited to form a grid inside the bounding section. Furthermore, the present invention reduces the risk of having different sampling in the X-direction and the Y-direction. Thus, the usage of a deterministic, pseudo-random pattern will, for many image blocks, provide more accurate representation of the feature vectors, thereby reducing the compression error.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which:

FIG. 9 is a flow diagram illustrating an embodiment of the pattern providing step of FIGS. 1 and 15;

FIG. 10 is a flow diagram illustrating additional steps of the method of FIG. 9 according to an embodiment of the present invention;

FIG. 11 is a flow diagram illustrating additional steps of the method of FIG. 9 according to another embodiment of the present invention;

FIG. 21 is a block diagram of an image decoder according to an embodiment of the present invention;

FIG. 22 is a block diagram of a block decoder according to an embodiment of the present invention; and FIG. 23 is a block diagram of an embodiment of the pattern provider of FIG. 22.

DETAILED DESCRIPTION

Figure 1:
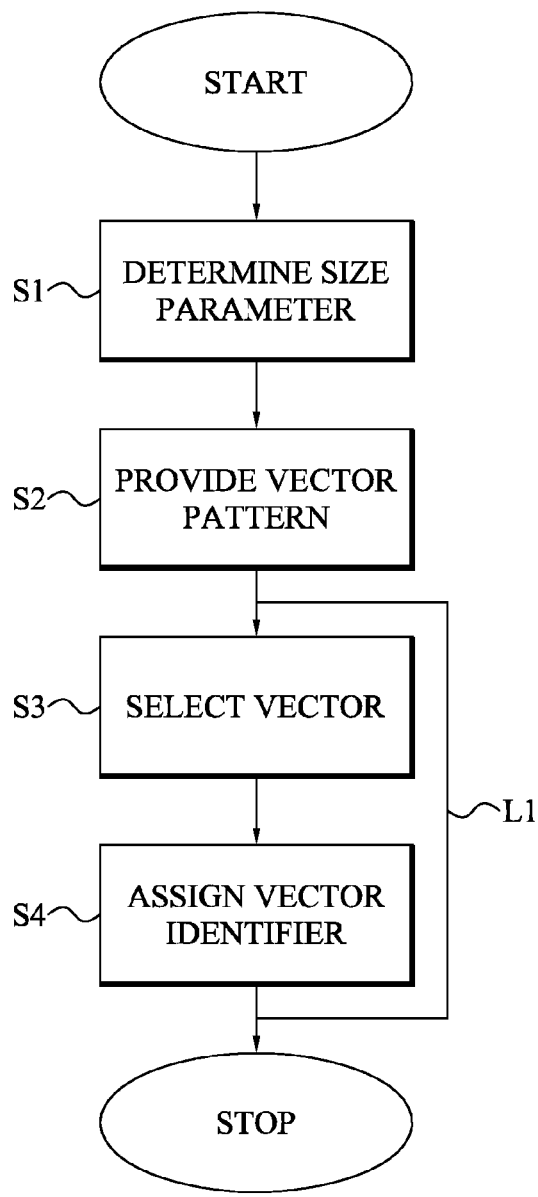
FIG. 1 is a flow diagram illustrating a method of compressing a block of image elements according to an embodiment of the present invention.

Throughout the drawings, the same reference characters will be used for corresponding or similar elements.

The present invention relates to image and graphic processing, and in particular to encoding or compressing images and blocks and decoding or decompressing encoded (compressed) images and blocks.

Generally, according to the invention, during image compression, an image is decomposed or divided into a number of blocks or tiles. Each such block then comprises multiple image elements having certain image element associated properties or features. The blocks are compressed to generate a compressed representation of the image.

When an encoded image or graphic primitive subsequently is to be rendered, e.g. displayed on a screen, the relevant image elements of the compressed blocks are identified and decompressed. These decompressed image elements are then used to generate a decompressed representation of the original image or graphics primitive.

The present invention is well adapted for usage with three-dimensional (3D) graphics, such as games, 3D maps and scenes, 3D messages, e.g. animated messages, screen savers, man-machine interfaces (MMIs), etc., but is not limited thereto. Thus, the invention could also be employed for compressing other types of images or graphics, e.g. one-dimensional (1D), two-dimensional (2D) or 3D images.

The invention is in particular suitable for handling bump or normal maps, or images. As is well-known in the art, a normal or surface normal denotes a 3D vector which is perpendicular to the surface (for a flat surface) or perpendicular to the tangent plane of the surface (for a non-flat surface).

In the present invention the expression "image element" refers to an element in a block or compressed representation of a block. This block, in turn, corresponds to a portion of an image or texture. Thus, according to the invention, an image element could be a texel (texture element) of a (1D, 2D, 3D) texture, a pixel of a (1D or 2D) image or a voxel (volume element) of a 3D image. Generally, an image element is characterized by certain image-element properties or features. In the present invention, each image element has a feature vector representing a feature associated with the image elements. This feature could control or influence the appearance of an image element. A preferred embodiment of such a feature vector is a surface normal, more preferably a normalized surface normal. Such a surface normal has three vector components or coordinates, i.e. X-, Y- and Z-components. However, it is generally enough to only specify two of the normal coordinates, such as X- and Y-coordinates per image element, as the remaining coordinate can be calculated therefrom, such as using equation 1 above.

Furthermore, in the following, the term "image" is used to denote any 1D, 2D or 3D image or texture that can be encoded and decoded by means of the present invention, including but not limited to bump maps, normal maps, photos, game type textures, text, drawings, high dynamic range images and textures, etc.

The present invention provides an image processing that is in particular suitable for compressing and decompressing images and blocks, where each image element has a two dimensional feature vector. In a preferred implementation of the invention, the two vector components represent two coordinates of a normalized surface normal, such as the X- and Y-coordinates (or X- and Z-coordinates or Y- and Z-coordinates). In the following, the invention is described in connection with a feature vector comprising an X component and a Y component. However, this should merely be seen as an illustrative example as any other combination of two of the X, Y, Z components could instead be used. If non-normalized normals are employed, the third component is simply added and processed in a similar manner to the other two components as described herein.

The image processing of the present invention is well-adapted for handling blocks as it allows a uniform distribution of reconstruction points in a bounding section, implying that the average distance from between two neighboring or adjacent reconstruction points in the bounding section is fairly uniform. This should be compared to prior art solutions requiring the reconstruction points to span or form a grid with the major disadvantage of obtaining different distances between two neighboring or adjacent reconstruction points in the X-direction as compared to the Y-direction for rectangular bounding boxes/sections. This means that the present invention improves the sampling of representation vectors in the bounding section to thereby reduce the risk of undersampling in either direction.

Compression/Coding

Figure 2:
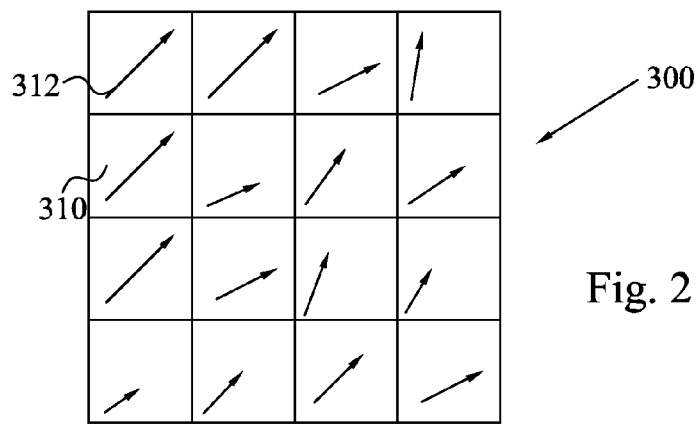
FIG. 2 is a schematic illustration of a block of image elements according to an embodiment of the present invention.

FIG. 1 illustrates a (lossy) method of compressing an image according to an aspect of the invention. The image is decomposed or divided into a number of blocks. Each such block comprises multiple, i.e. at least two, image elements. In a preferred embodiment of the invention, an block comprises sixteen image elements (pixels, texels or voxels) and has a size of $2^m \times 2^n$ image elements, where m=4−n and n=0, 1, 2, 3, 4. More preferably, m and n are both 2. It could also be possible to utilize an block of size $2^m \times 2^n$ or $2^m \times 2^n \times 2^p$ image elements, where m, n, p are zero or positive integers with the proviso that not all of m, n, p may simultaneously be zero. FIG. 2 schematically illustrates an example of a block 300 with sixteen image elements 310 according to the present invention. The figure also schematically illustrates the different feature vectors or normals 312 associated with the image elements 310.

Step S1 involves determining at least one parameter representative of a size of a bounding section in feature vector space. This bounding section encompasses at least a portion, preferably all, of the feature vectors in the block. The bounding section is typically a parallelogram in feature vector space and in particular a right-angled axis-aligned parallelogram, i.e. square or rectangular.

In a particular embodiment, step S1 first involves defining this bounding section. This definition can be realized by identifying the smallest and largest first vector component (such as X component) and the smallest and largest second vector component (such as Y component) of the 2D feature vectors in the block. In the case of 3D feature vectors, the bounding section is a parallelepiped, preferably a right-angled parallelepiped, and the smallest and largest components of the three vector components are determined. The bounding section is then defined using these identified components, such as $X_{min}$, $X_{max}$, $Y_{min}$, $Y_{max}$.

The at least one size parameter can then be determined based on the identified vector components of the bounding section. For instance, a first embodiment could use all four components, $X_{min}$, $X_{max}$, $Y_{min}$, $Y_{max}$, as size parameter for the bounding box. In an alternative approach at least two parameters calculated therefrom, such as $\Delta X = X_{max} - X_{min}$ and $\Delta Y = Y_{max} - Y_{min}$, can instead be used. Other approaches could use only one of the vector components as size parameter, such as $X_{min}$, $X_{max}$ or $\Delta X = X_{max} - X_{min}$, or $Y_{min}$, $Y_{max}$ or $\Delta Y = Y_{max} - Y_{min}$. In the first case, the parameter basically represents the width of the bounding parallelogram, while in the latter case it represents its height. A further approach is to use a representation of the aspect ratio of two parameters, such as $\Delta X / \Delta Y$ or $\Delta Y / \Delta X$. Another possible size parameter that can be used according to the invention is a representation of the diagonal of the bounding parallelogram. Also a combination of two or more of the above presented parameters can be used in the present invention. Thus, there are several possibilities in the particular choice of the at least one size parameter to determine in step S1 and use in the block compression of the present invention. However, a parameter or a set or multiple parameters that represents the size or relative size of each dimension of the bounding section is preferred.

The key concept regarding size parameter selection is that a same type of parameter or a same set of multiple parameters is preferably used for different blocks compressed according to the present invention. Thus, if the size parameters include $\Delta X$, $\Delta Y$ for a first block, the same parameter types, i.e. $\Delta X$, $\Delta Y$ are preferably also used for a second block, though the actual values of $\Delta X$, $\Delta Y$ may of course differ between the two blocks.

A next step 82 uses the determined size parameter(s) for providing a deterministic, pseudo-random pattern of N multiple representation vectors or reconstruction points encompassed by the bounding section in feature vector space. Thus, in clear contrast to prior techniques generating a grid of representation vectors in feature vectors space, the present invention uses the determined size parameter(s) as input to provide a deterministic, pseudo-random pattern in which the N multiple representation vectors do not form such a grid having the a first vector distance along the X-direction and a second vector distance along the Y-direction.

As is well-known in the art, a deterministic pattern implies that given the same input, i.e. size parameter(s), a same pattern of representation vectors is obtained. Note though that two different inputs may result in the same pattern. Pseudo-random pattern means that the same sequence of representation patterns is provided when initialized with a same seed state or input, i.e. size parameter(s). The pseudo-random nature of the pattern also implies that the N multiple representation vectors are somewhat randomly distributed inside the bounding section to thereby achieve a non-grid pattern that will more correctly represent the original distribution of the feature vectors in the block.

Figure 3:
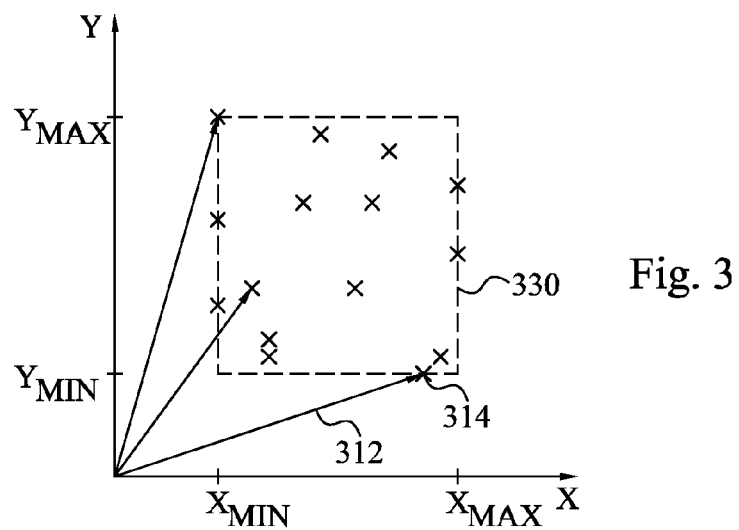
FIG. 3 is a diagram illustrating feature vectors of a block according to the present invention.
Figure 4:
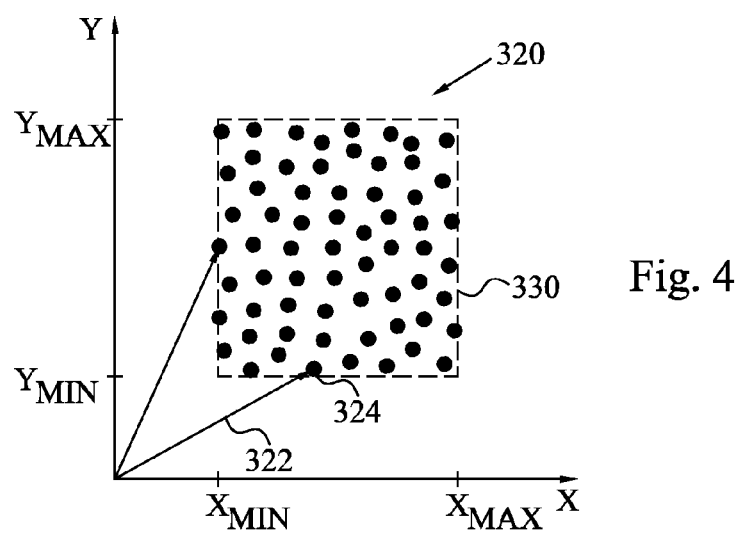
FIG. 4 is a diagram illustrating a deterministic, pseudo-random pattern of representation vectors according to an embodiment of the present invention.

FIGS. 3 and 4 illustrate this principle of the invention. FIG. 3 illustrates the distribution of the 2D feature vectors (normal) 312 in feature vector space, in this case in the X-Y plane. In the figure only four of the feature vectors 312 have been explicitly illustrated, while for the remaining image elements in the block only the corresponding endpoints 314 of the vectors 312 are marked. Only one of the feature vectors and its endpoint has been provided with a reference sign in order to simplify the drawing. The figure also illustrates the bounding section 330, here in the form of a right-angled axis-aligned parallelogram enclosing the endpoints 314 of the vectors 312. The size of the bounding section 330 is defined by the respective minimum and maximum vector components of the feature vectors 312 in the block.

FIG. 4 illustrates the same bounding section 330 and with N multiple representations vectors 322 having endpoints 324 encompassed by the bounding section 330. In the figure, only one representation vector and its endpoint has been given reference sign in order to simplify the drawing. As is clearly seen in the figure, the pseudo-random pattern 320 or distribution of the representation vectors 322 inside the bounding section 330 is far from a grid but can still provide a uniform coverage of the whole bounding section area without any undersampling in the X- or Y-direction.

Returning to FIG. 1 and a next step S3, where a representations vector from the pseudo-random pattern of N multiple representations vectors is selected as a representation of a feature vector for an image element in the block. This selection is furthermore performed based on a feature vector associated with the image element. In a typical implementation, the vector having an end point that lies closest to the end point of the feature vector is selected in step S3 as this minimizes the compression error.

A next step S4 assigns a vector identifier or index associated with the selected vector to the image element. The steps S3 and S4 are preferably repeated for each image element in the block, which is schematically illustrated by line L1. This means that in such a case each image element of the resulting compressed block has an assigned vector identifier allowing identification of a vector among the N representation vectors.

The selection step S3 and assigning step S4 can be implemented using the following pseudo-code:

```
for q = 0 to 15 //for all image elements assuming a block according
to Fig. 2
{
   minerr = MAXERR;
   for i = 0 to 63 //for all representation vectors with N=64
   {
      err = (fv_x[q] − rv_x[i]) × (fv_x[q] − rv_x[i]);
      err = err + (fv_y[q] − rv_y[i]) × (fv_y[q] − rv_y[i]);
      if err < minerr
      {
         minerr = err;
         compressed[q] = i;
      }
   }
}
```

In this case the 2D feature vectors to be encoded are stored in fv_x[ ] (containing the X-components) and fv_y[ ] (containing the Y-components). The N representations vectors are stored in rv_x[ ] (containing the X-components) and rv_y[ ] (containing the Y-components). The array compressed[ ] comprises, for each of the image element, a vector identifier i associated with the representation vector that results in the shortest distance vector from the endpoint of the feature vector and to the endpoint of the representation vector.

Steps S1 to S6 are preferably repeated for all blocks provided during the image decomposing. The result is then a sequence or file of compressed blocks. The resulting compressed blocks could be ordered in a file from left to right and top to bottom in the same order in which they were broken down in the block decomposing. The method then ends.

The compressed image can be provided to a memory for storage therein until a subsequent rendering, e.g. display, of the image. Furthermore, the compressed image can be provided as a signal of compressed block representations to a transmitter for (wireless or wired) transmission to another unit.

Figure 5:
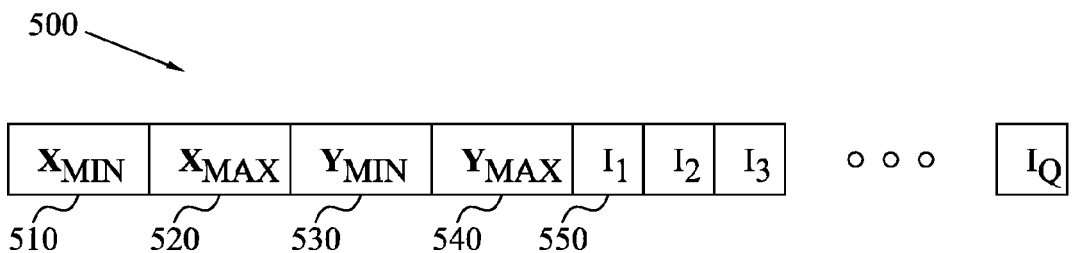
FIG. 5 is a schematic illustration of a compressed block according to an embodiment of the present invention.

The result of the block compression described above and disclosed in FIG. 1 is a compressed representation of the block. Such a compressed block representation 500 is illustrated in FIG. 5. The compressed block 500 comprises a representation of the size parameter 510, 520, 530, 540. In the figure, the compressed block 500 comprises representations of the coordinates 510, 520, 530, 540 of two diagonally opposite corners of the bounding parallelogram.

If the feature vectors each have P bits per vector component, the size representations 510, 520, 530, 540 could also have P bits. In another embodiment, the size parameter representations 510, 520, 530, 540 contain fewer numbers of bits as compared to the vector components of the feature vectors. For instance, the coordinate representations 510, 520, 530, 540 could be M bits, where M<P. It is also possible to spend different number of bits for different the different size parameters 510, 520, 530, 540.

The compressed block 500 also comprises the vector identifiers 550, preferably one such vector identifier 550 per image element of the block.

In a typical implementation having a block layout as illustrated in FIG. 2, i.e. Q in FIG. 5 is sixteen, and when N=64 representation vectors are provided in the deterministic, pseudo-random pattern, eight bits can be spent per size parameter representation 510, 520, 530, 540. This results in 4×8=32 bits. We have 64 different representation vectors in this illustrative example and therefore require 6-bit vector identifiers 550. This gives a total bit size for the identifier sequence of 16×6=96 bits. The total size of the compressed block 500 therefore becomes 32+96=128 bits.

An advantage of the pseudo-randomization of representation vectors is that it is possible to use an odd number of bits per vector identifier 550. In grid-based systems according to prior art, the number of bits per image element used for the vector identifiers is divisible by two since it is otherwise not possible to create a grid of M×M representation vectors without wasting bits. For instance, a grid using a 5-bit vector identifier would demand that M×M<$2^5$=32, meaning that M must be 5, thus wasting 32−25=7 bit combinations. In practice this forces grid-based systems to use either four or six identifier bits per image element. The present invention, however, can use odd identifier bits, such as 5- or 7-bit vector identifiers 550.

The present invention is not limited the particular bit layout illustrated in FIG. 5. Actually any order of the including elements, i.e. size parameters representations 510, 520, 530, 540 and vector identifiers 550, can be used.

Figure 6:
FIG. 6 is another diagram illustrating feature vectors of a block according to the present invention.

Sometimes the feature vectors of a block are not necessarily best representable using a bounding parallelogram having sides parallel with the X- and Y-axis. FIG. 6 illustrates such an example. As is seen in the figure, the smallest possible bounding section of a right-angled parallelogram 330 that encompasses all feature vectors is actually rotated and therefore not axis-aligned. Such a bounding section 330 can be expressed in a new coordinate frame using only two vectors $v_1$ 342 and $v_2$ 344 and a height factor, such as $$h = \frac{\text{height}}{\text{width}},$$

where width=$\|v_1-v_2\|$ and height is the height of the rotated parallelogram 330. The two axes of this coordinate frame are simply $\hat{e}_1=v_2-v_1$ and $\hat{e}_2=(-\hat{e}_{1y}, \hat{e}_{1x})$.

The lower left corner of this bounding parallelogram 330 is $v_1-0.5h\hat{e}_2$ and the diagonally opposite corner is defined by $v_1+0.5h\hat{e}_2+\hat{e}_1$.

Figure 7:
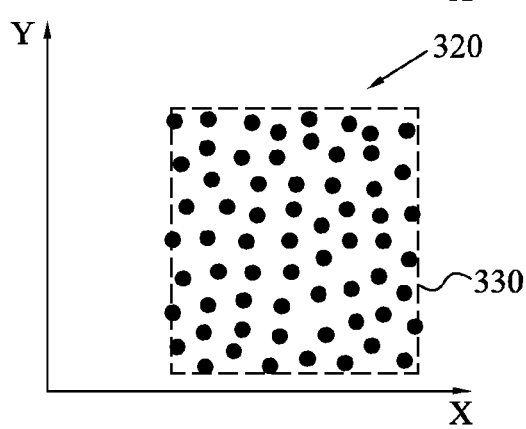
FIG. 7 is a diagram illustrating a deterministic, pseudo-random pattern of representation vectors according to an embodiment of the present invention.
Figure 8:
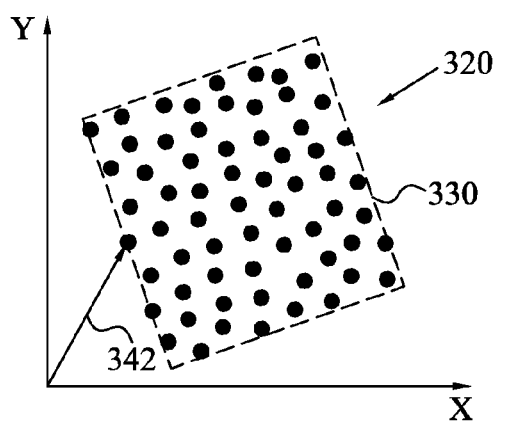
FIG. 8 is a diagram illustrating a rotation of the vector pattern of FIG. 7 to align the pattern with the axis of an original bounding section of FIG. 6.

In this case, the parameter h could be used as size parameter and input for providing the deterministic, pseudo-random pattern of representation vectors. In a preferred embodiment, the bounding section 330 is first aligned with the X- and Y-axis as illustrated in FIG. 7. The at least one size parameter, such as h or any of the previously described ones or combinations thereof, is employed for generating the pattern 320 of representation vectors inside the bounding section 330. Thereafter the bounding section 330 and more importantly the pattern 320 of representation vectors is rotated so that the original rotated position illustrated in FIG. 6 is reached. This involves in the present case rotating the pattern 320 around a rotation point defined by the lower left corner $(X_{min}, Y_{min})$ of the bounding parallelogram 330 until the midpoint of the left side of the parallelogram aligns with the vector $v_1$ 342. Thereafter the selection of best-matching representation vectors and assignment of vector identifiers can be performed as previously described.

Thus, in the case a rotation-invariant feature vector compression is employed, the deterministic, pseudo-random pattern is preferably first provided and then rotated to align the sides of the bounding parallelogram with the axis of the coordinate frame.

In this case, the compressed block preferably comprises a representation of the two vectors $v_1$ and $v_2$ and a representation height in addition to the sequence of vector identifiers.

It is anticipated by the present invention that the bounding section and deterministic pseudo-random pattern of representation vectors do not necessarily have to be only rotated but other forms of movements such as translation or translation and rotation are also possible.

FIG. 9 is a flow diagram illustrating an embodiment of the vector providing step S2 of FIG. 1. The method continues from step S1 of FIG. 1. In this embodiment the at least one size parameter is utilized as initial seed input of a deterministic, pseudo-random function for the purpose of generating the pattern of N representation vectors. The method starts in step S10 where a vector counter k is set to zero and the seed input is set to be the size parameter. A next step S11 inputs the seed into a deterministic, pseudo-random function or generator that outputs or draws a representation vector $v_o$. A next step S12 investigates whether k=N−1, i.e. if we have drawn the required number N of representation vectors. If k≠N−1 the method continues to step S13 where the drawn representation vector $v_0$ is employed as seen input and the vector counter k is increased by one.

As is evident from above a drawn representation vector comprises two vector components, such as $v_x$ and $v_y$. The pseudo-random function or generator could either use two numbers as input, i.e. $v_x$ and $v_y$ or the initial size parameters, such as $\Delta X$ and $\Delta X$, $\Delta X/\Delta Y$ or $\Delta Y/\Delta X$. Alternatively, a single number is first generated based on the vector components or the multiple size parameters, such as by adding them together.

In either case the method continues from step S13 back to step S11 where a new representation vector $v_1$ is output based on the previous representation vector $v_0$ as seed input. The loop of steps S11 to S13 is repeated until N representation vectors have been drawn $v_0$-$v_{N-1}$. In this loop the input to the deterministic, pseudo-random function or generator is a previous representation vector $v_{k-1}$ for providing a next vector $v_k$ unless k=0, in which case the seed is the size parameter. Once the N different representation vectors have been provided the method continues to step S3 of FIG. 1.

This embodiment can be implemented using the following pseudo-code. In this case the function RAND( ) draws a random number in the interval [0.0, 1.0], i.e. the interval including the endpoints 0.0 and 1.0. The seed is set by the function SEED( ). In this illustrative example, the representation vectors are scaled with $\Delta X$ and $\Delta Y$ to correct size of the bounding section.

```
function generate_representation_vectors(X_min, X_max, Y_min, Y_max)
ΔX=X_max-X_min;
ΔY=Y_max-Y_min;
if ΔX==ΔY
{
    SEED(ΔX×256+ΔY) //generate initial seed based on size parameters
    for i = 0 to 63 //provides N=64 representation vectors
    {
        rv_x[i] = X_min + ΔX × RAND( );
        rv_y[i] = Y_min + ΔY × RAND( );
    }
}
```

The X- and Y-coordinates of the representation vectors are now stored in rv_x[ ] and rv_y[ ], respectively.

The above presented pseudo-code is adapted for the case where the bounding section is a square. However, if $\Delta X$ is not equal $\Delta Y$ care should be taken to avoid undersampling in one of the direction. One possible implementation of creating a pattern of representation vectors that indeed preserve the equal sampling property would be to scale the random value with the bigger of $\Delta X$ and $\Delta Y$ and then simply discard the points that fall outside the bounding section.

FIG. 10 is a flow diagram illustrating additional steps of the block compressing method. The method continues from step S11 of FIG. 9. The next step S20 investigates whether a newly drawn representation vector $v_k$ is present inside or at the border of the bounding section. If the vector $v_k$ falls outside of the bounding section it is discarded and a new vector $v_k$ is drawn (using the discarded vector as seed). This check and discarding is continued until a representation vector $v_k$ encompassed by the bounding section in feature vector space is found and the method continued to step S12 of FIG. 9. The pseudo-code for such an implementation could be as:

```
function generate_representation_vectors(X_min, X_max, Y_min, Y_max)
ΔX=X_max-X_min;
ΔY=Y_max-Y_min;
SEED(ΔX×256+ΔY) //generate initial seed based on size parameters
if ΔX==ΔY //if square bounding section
{
    for i = 0 to 63 //provides N=64 representation vectors
    {
        rv_x[i] = X_min + ΔX × RAND( );
        rv_y[i] = Y_min + ΔY × RAND( );
    }
}
else //for rectangular bounding sections
{
    if ΔX > ΔY //scaling the random value according to the
        bigger of ΔX, ΔY, Δbig = ΔX;
    else
        Δbig = ΔY;
    for i = 0 to 63 //provides N=64 representation vectors
    {
        candidate_x = Δbig×RAND( ); //candidate representation vectors
        candidate_y = Δbig×RAND( );
        while NOT((candidate_x≤ΔX) AND (candidate-y≤ΔY))
        {
```

```
        candidate_x = ΔbigxRAND( ); //old candidate vector is discarded
        and candidate_y = ΔbigxRAND( ); // a new candidate vector
        is drawn
      }
      rv_x[i] = X_min + candidate_x;
      rv_y[i] = Y_min + candidate_y;
    }
}
```

A further embodiment of the present invention investigates whether a drawn representation vector is positioned close in feature vector space to a previously drawn vector. In order to provide such a well-distributed pseudo-random pattern as possible covering the whole or at least a substantial portion of the area of the bounding section it is preferred if the representation vectors does not end at points situating too close relative each other.

FIG. 11 is a flow diagram illustrating additional steps of the compressing method. The method continues from step S11 of FIG. 9. A next step S30 investigates whether the length of the distance vectors between a drawn vector $v_k$ and previously drawn representation vectors $v_d$, where d=0, . . . , k-1, is smaller than a defined threshold T. In such a case, the current candidate representation vector is discarded and a new candidate vector $v_k$ is drawn and tested in step S30. If the candidate representation vector is sufficiently far from the previous vectors the method continues to step S12 of FIG. 9.

It may, depending on the particular pseudo-random pattern generated, be harder and harder to draw a new representation vector positioned with the minimum length from previously drawn representation vector as one approaches N vectors. In such a case, an adaptation of the threshold T can be employed. For instance, if a pre-defined number of new representation vectors have been drawn and discarded in S31 without meeting the requirement tested in step S30, the threshold value T can be reduced to $T_1 < T$. The procedure can then be continued using the new threshold $T_1$ to draw the few remaining representation vectors of the N vectors. This stepwise reduction of the threshold can be performed in multiple steps if no new vector has been drawn in the last pre-defined number of trials using the reduced vector $T_1$.

It is anticipated by the present invention that the threshold T can be exchanged for two different threshold values, $T_x$ and $T_y$, i.e. one for each vector component. In such a case step S30 involves checking whether $\sqrt{(v_{k_x}^2 - v_{d_x}^2)} < T_x$ and $\sqrt{(v_{k_y}^2 - v_{d_y}^2)} < T_y$.

The procedure described above and illustrated in FIG. 11 provides representation vectors distributed according to a Poisson distribution or at least a Poisson-like distribution. Thus, a Poisson distribution gives points that have a minimum distance from each other. This is an advantage as otherwise representation vectors could be very close to each other, resulting in that another part of the bounding section is poorly sampled. Also other methods of obtaining Poisson (or Poisson-like) distributions of representation vectors can used in the vector sampling of the present invention.

It is anticipated by the present invention that a combination of the embodiments disclosed in FIGS. 10 and 11 can be used in order to first investigate whether the candidate representation vector is within the bounding section and then check so that it is not too close a previously determined representation vector.

Figure 13:
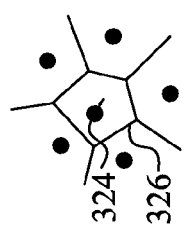
FIG. 13 is an illustration graphically depicting the operation of the method of FIG. 12.
Figure 12:
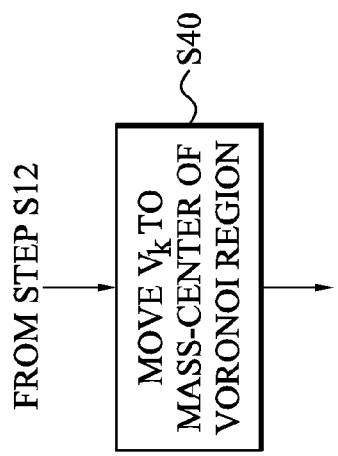
FIG. 12 is a flow diagram illustrating an additional step of the method of FIG. 9 according to a further embodiment of the present invention.

Another embodiment of the present invention that can be separate from or in combination with any of the embodiment disclosed in FIGS. 10 and 11 is illustrated in FIG. 12. The method continues from step S11 of FIG. 9. Once the N representation vectors have been drawn the resulting deterministic, pseudo-random pattern is relaxed by iteratively moving each representation vector to the mass-centre of its Voronoi region or cell. As is well known in the art, if S is a set of n points in Euclidean space of dimension d the Voronoi region V(p) of a point p of S is the set of points that a closer to p than to other points of S. FIG. 13 illustrates such a Voronoi region 326 for an endpoint 324 of a representation vector. The representation vector is then moved so that it instead points towards the mass-centre of the Voronoi region 326. This vector movement and relaxation is preferably performed in an iterative process as the movement of one vector affects the Voronoi region 326 of neighboring representation vectors.

In order to allow at least some representation vectors to point towards the bounding section border following the relaxation, the Voronoi regions on the border can be extended some distance, such as $$\frac{1}{7}th$$

outside the bounding section.

Once the pattern relaxation is completed, the method continues to step S3 of FIG. 1.

Figure 14:
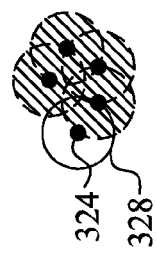
FIG. 14 is an illustration graphically depicting generation of a deterministic, pseudo-random pattern according to an embodiment of the present invention.

Another embodiment of generating a deterministic, pseudo-random pattern according to the invention is schematically illustrated in FIG. 14. This embodiment involves providing a candidate representation vector using the size parameter as seed. An optional step investigates whether the candidate representation is present within the bounding section and discards the vector if not. A new representation vector is randomly provided to point towards a point on the circumference of a circle 328 centered at the endpoint 324 of the previously provided representation vector. An optional check can once more be performed to investigate whether the new representation vector is inside the bounding section or not. This procedure is repeated to get the N multiple representation vectors so that a representation vector $v_k$ points towards the circumference of a circle positioned at the endpoint of the previous vector $v_{k-1}$.

In order to prevent the representation vectors from pointing towards endpoints positioned close to each other and thereby risk having poor sampling in a portion of the bounding section another check and possible vector discarding can be used in this embodiment. Thus, a representation vector $v_k$ is discarded if the vector $v_k$ points towards a point encompassed by a circle centered at an endpoint a previously provided representation vector $v_d$ d=0, . . . , k-1. In this embodiment, the vector is, thus, discarded if it falls inside a circle associated with and centered on the endpoint of a previously drawn representation vector. In FIG. 14, those areas that are hatched are not available for a next representation vector that is to end on the circumference of the indicated circle 328.

The deterministic, pseudo-random pattern provided in step S2 of FIG. 1 can be generated on the fly according to any of the previously described embodiments. In such a case, such a pattern is generated, starting from the size parameter seed, for each block to be compressed. An alternative approach is to first pre-calculate multiple different deterministic, pseudo-random patterns using any of the described embodiments for different seed values. These pre-calculated patterns are then stored in a table or database. As a consequence, during compression the representation vectors are not generated. In clear contrast, the pattern provision of step S2 of FIG. 1 comprises providing or retrieving the deterministic, pseudo-random pattern from the database using the at least one size parameter as table or database look-up index.

If the size parameters are 8-bit sequences as previously described a size parameter, such as $\Delta X$, can be any of $2^8=256$ values. The same applies for the Y-component, $\Delta Y$. There are therefore 256×256=65536 different combinations of such size parameters. This would then amount pre-calculating and storing 65536 pseudo-random patterns. An alternative approach is to reduce the number of calculated and stored patterns and instead associate each such pattern with a range or interval of size parameters instead of a particular value. For instance, if $t_1 \leq \Delta X < t_2$ a first pseudo-random pattern is used, if $t_2 \leq \Delta X < t_3$ a second pattern of representation vectors should be employed and so on, where $t_1 < t_2 < t_3$. An alternative is to define a width parameter as width=max($\Delta X$, $\Delta Y$) and a height parameter height=min($\Delta X$, $\Delta Y$). In such a case, the aspect ratio of these parameters H=height/width (0<H≤1) can used to select which pattern to use. For example, if $s_1 \leq H < s_2$ a first pseudo-random pattern is used, if $s_2 \leq H < s_3$ a second vector pattern is used and so on, where $s_1 < s_2 < s_3$.

This has the further advantage that different initial seeds present inside the relevant interval can be tested and the resulting pattern investigated for the purpose of discarding those patterns that have poor sampling in some areas of the bounding section. In such a case, only that pattern that seems to have the most appropriate pseudo-random pattern is stored for the given interval of size parameter seed.

The provision of the pattern then involves comparing the determined size parameter(s) with the different pre-defined intervals and identifying the pattern in the database being associated with the interval in which the size parameter is present.

Decompression/Decoding

Figure 15:
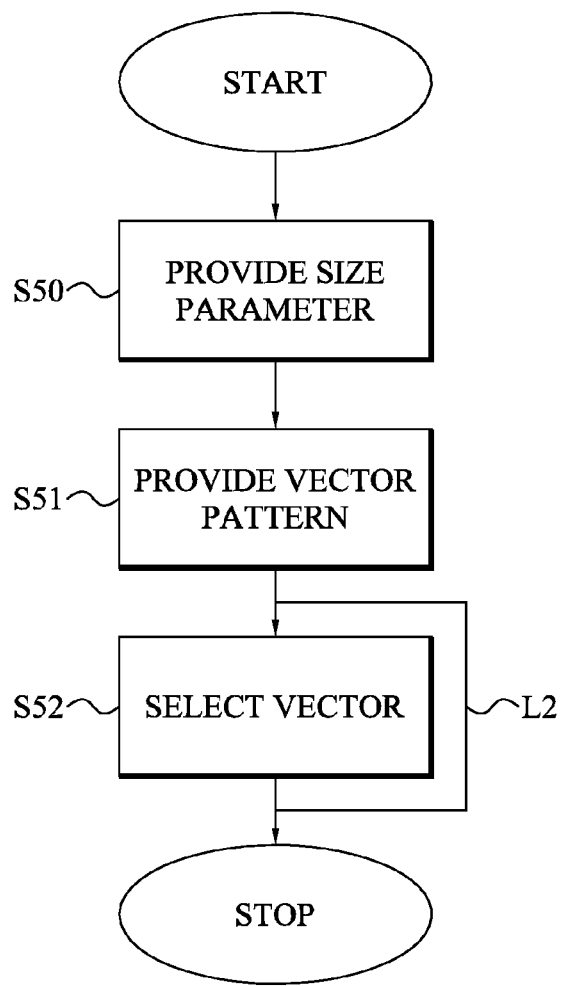
FIG. 15 is a flow diagram illustrating a method of decoding a compressed block according to an embodiment of the present invention.

FIG. 15 illustrates a flow diagram of a method of decompressing a compressed image according to the present invention. The compressed image basically comprises several compressed representations of blocks. These block representations are preferably generated by the image compressing method discussed above.

The method generally starts by identifying compressed block(s) to decompress. It could be possible that all blocks of a compressed image should be decompressed to generate a decompressed representation of the original image. Alternatively, only a portion of the original image is to be accessed. As a consequence, only a selected number of blocks have to be decompressed (or more precisely, a selected number of image elements of certain blocks have to be decoded).

Once the correct compressed block(s) is identified, step S50 provides, in this embodiment, at least one size parameter based on the compressed block. The providing step S50 can be performed simply by retrieving the respective bit combination for the one or more size parameters and use them directly as parameters. For instance, if a parameter in the compressed block comprises P bits, the retrieved parameter will contain P bits. In an alternative embodiment the parameter representation comprises M bits, where M<P. In such a case the retrieved M-bit sequence can be expanded or extended in step S50 into a P bit sequence constituting the size parameter. This bit expansion can be realized by replicating the P-M least significant bits (or most significant bits) of the M-bit sequence and adding them as the most significant bits (or least significant bits) to form a P-bit sequence. As has been further discussed in the foregoing, the size parameter could in addition be calculated based on the retrieved sequences, such as calculation of $\Delta X$ and $\Delta Y$ from the compressed block containing $X_{min}$, $X_{max}$, $Y_{min}$ and $Y_{max}$.

A next step S51 uses the provided size parameter for the purpose of providing a deterministic, pseudo-random pattern of N multiple representation vectors encompassed by the bounding section in feature vector space. This provision of S51 is basically performed in a similar way as to the corresponding step S2 of the compression method in FIG. 1. As a consequence, the previously described embodiments, which are further disclosed in FIGS. 9-14 can also be used in the block decoding. In such a case, a copy of the pseudo-random function or generator that was employed in the block compression is also employed in the block decoding. This means that given a same size parameter the same pseudo-random pattern is generated both in the compression and the decoding.

Correspondingly, if multiple deterministic, pseudo-random patterns have been pre-calculated and are stored in a database, step S51 can involve using the size parameter provided in step S50 as pattern identifier for the purpose of identifying and retrieving a relevant pattern from the database.

In the case the bounding section is to be rotated and/or translated, the provided pattern is rotated/translated in feature vector space based on the two vector representations discussed in the foregoing and which are included in the compressed block.

The method then continues to step S52 where a vector is selected for an image element in the block and among the N representation vectors. The selected vector is then employed as decoded representation of the original feature vector of the image element. The vector selection is performed based on the vector identifier or index associated with the image element and included in the compressed block, see FIG. 5.

The final feature vector representation of the image element can optionally be determined by calculating a third vector component of the selected representation vector using components of the 2D vector and equation 1.

Step S52 could be performed for several image elements in the block (schematically illustrated by line L2). It is anticipated by the invention that in some applications, only a single image element is decoded from a specific block, multiple image elements of a specific block are decoded and/or all the image elements of a specific block are decoded.

Steps S50 to S52 are then preferably repeated for all blocks that comprise image elements that should be decoded. This means that the loop of steps S50 to S52 could be performed once, but most often several times for different compressed blocks and/or several times for a specific compressed block.

A decompressed representation of the original image, or a portion thereof, is generated based on the decoded image elements and blocks. Note that in some applications, several image elements have to be decoded in order to render a single pixel of the decoded representation. For example, during trilinear interpolation, eight image elements are decoded and for bilinear interpolation the corresponding number is four image elements, which is well known to the person skilled in the art. The method then ends.

Implementation Aspects

The block (image) compression and block (image) decompression scheme according to the present invention could be provided in a general data processing system, e.g. in a user terminal or other unit configured for processing and/or rendering images. Such a terminal could be a computer, e.g. PC, a game console or a thin client, such as a Personal Digital Assistance (PDA), mobile unit and telephone.

The compression and/or decoding method according to the present invention may be implemented as software, hardware, or a combination thereof. A computer program product implementing the method or a part thereof comprises a software or a computer program run on a general purpose or specially adapted computer, processor or microprocessor. The software includes computer program code elements or software code portions that make the computer perform the method using at least one of the steps previously described in FIG. 1 or 15 and preferably also in FIGS. 9-12. The program may be stored in whole or part, on, or in, one or more suitable computer readable media or data storage means such as a magnetic disk, CD-ROM or DVD disk, USB memory, hard disk, magneto-optical memory storage means, in RAM or volatile memory, in ROM or flash memory, as firmware, or on a data server.

User Terminal

Figure 16:
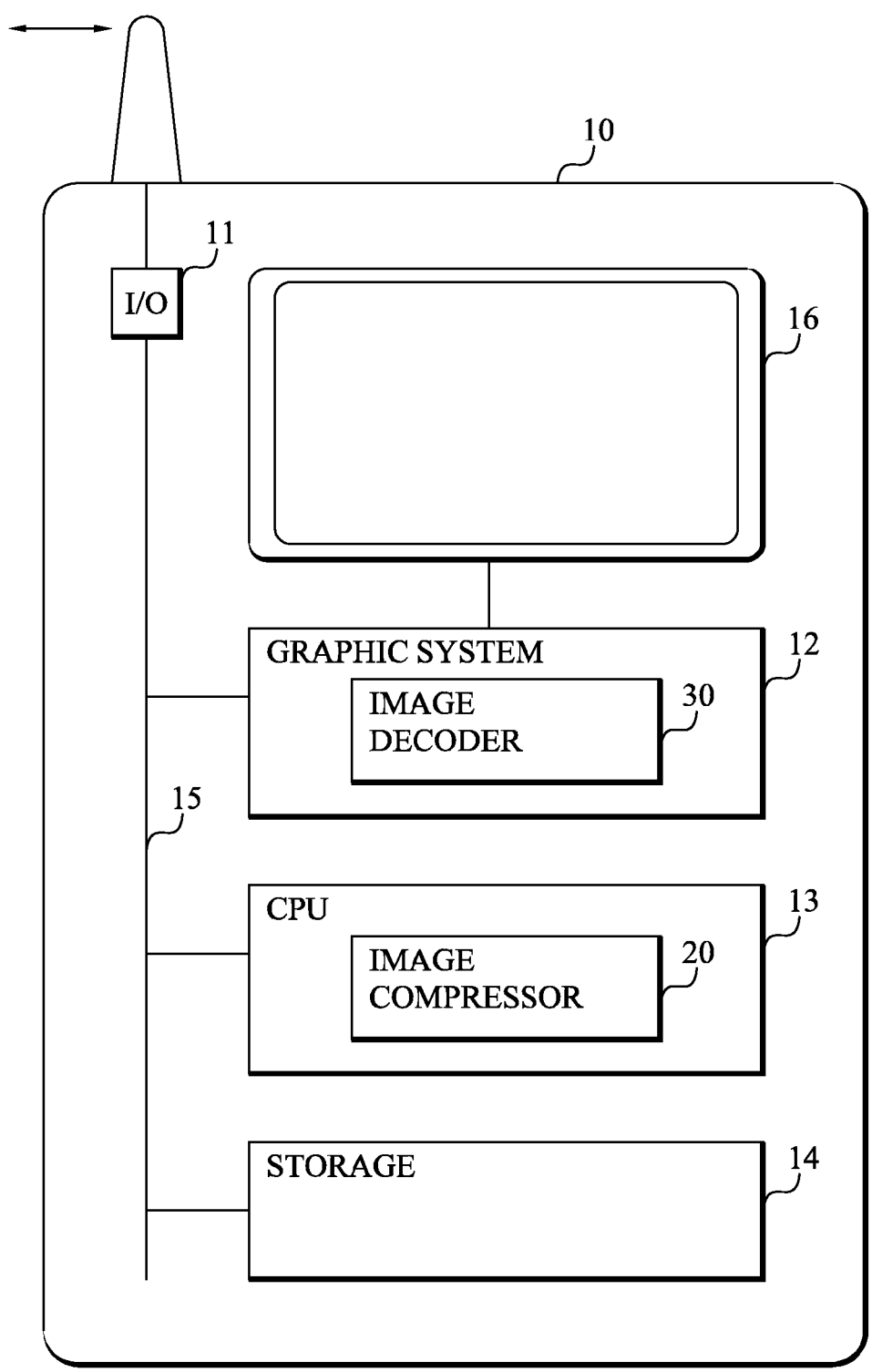
FIG. 16 is block diagram of a user terminal equipped with an image compressor and image decoder according to the present invention.

FIG. 16 illustrates a user terminal 10 represented by a mobile unit. However, the invention is not limited to mobile units but could be implemented in other terminals and data processing units, such as PC computers and game consoles. Only means and elements in the mobile unit 10 directly involved in the present invention are illustrated in the figure.

The mobile unit 10 comprises a (central) processing unit (CPU) 13 for processing data, including image data, within the mobile unit 10. A graphic system 12 is provided in the mobile unit 10 for managing image and graphic data. In particular, the graphic system 12 is adapted for rendering or displaying images on a connected screen 16 or other display unit. The mobile unit 10 also comprises a storage or memory 14 for storing data therein. In this memory 14 image data may be stored, in particular compressed image data according to the present invention.

An image compressor 20 according to the present invention is typically provided in the mobile unit 10. This compressor 20 is configured for compressing an image or texture into a compressed representation of the image. As was discussed above, such a compressed representation comprises a sequence or file of multiple compressed blocks. This image compressor 20 may be provided as software running on the CPU 13, as is illustrated in the figure. Alternatively, or in addition, the compressor 20 could be arranged in the graphic system 12 or elsewhere in the mobile unit 10.

A compressed representation of an image from the block compressor 20 may be provided to the memory 14 over a (memory) bus 15, for storage therein until a subsequent rendering of the image. Alternatively, or in addition, the compressed image data may be forwarded to an input and output (I/O) unit 11 for (wireless or wired) transmission to other external terminals or units. The I/O unit 11 could, for instance, represent the transmitter and receiver chain of the user terminal. The I/O unit 11 can also be adapted for receiving image data from an external unit. This image data could be an image that should be compressed by the image compressor 20 or compressed image data that should be decompressed. It could also be possible to store the compressed image representation in a dedicated texture memory provided, for example, in the graphic system 12. Furthermore, portions of the compressed image could also, or alternatively, be (temporarily) stored in a texture cache memory, e.g. in the graphic system 12.

An image decompressor 30 according to the present invention is typically provided in the mobile unit 10 for decompressing a compressed image in order to generate a decompressed image representation. This decompressed representation could correspond to the whole original image or a portion thereof. The image decompressor 30 provides decompressed image data to the graphic system 12, which in turn typically processes the data before it is rendered or presented on the screen 16. The image decompressor 30 can be arranged in the graphic system 12, as is illustrated in the figure. Alternatively, or in addition, the decoder 30 can be provided as software running on the CPU 13 or elsewhere in the mobile unit 10.

The mobile unit 10 could be equipped with both an image compressor 20 and an image decompressor 30, as is illustrated in the figure. However, for some terminals 10 it could be possible to only include an image compressor 20. In such a case, compressed image data could be transmitted to another terminal that performs the decompression and, possibly, rendering of the image. Correspondingly, a terminal 10 could only include an image decompressor 30, i.e. no compressor. Such a terminal 10 then receives a signal comprising compressed image data from another entity and decompresses it to generate a decompressed image representation. Thus, the compressed image signal could be wirelessly be transmitted between terminals using radio transmitter and receiver. Alternatively, other techniques for distributing images and compressed image representations between terminals according to the invention could be employed, such as BLUETOOTH®, IR-techniques using IR ports and wired transferring of image data between terminals. Also memory cards or chips, including USB memory, which can be connected and exchanged between terminals could be used for this image data inter-terminal distribution.

The units 11, 12, 13, 20 and 30 of the mobile unit 10 may be provided as software, hardware or a combination thereof.

Image Encoder

Figure 17:
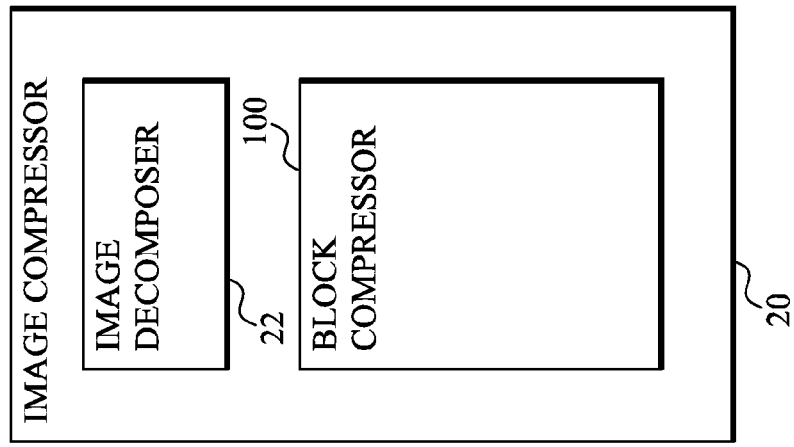
FIG. 17 is a block diagram of an image compressor according to an embodiment of the present invention.

FIG. 17 illustrates a block diagram of an embodiment of an image compressor 20 according to the present invention. The compressor 20 typically comprises an image decomposer 22 for decomposing or dividing an input image into several blocks of multiple image elements. The decomposer 22 is preferably configured for decomposing the image into blocks comprising sixteen image elements (pixels, texels or voxels), i.e. having a general size of 4×4 image elements. This decomposer 22 could be adapted for decomposing different input images into blocks with different sizes. In such a case, the decomposer 22 preferably receives input information, enabling identification of which block format to use for a given image.

This embodiment of the image compressor 20 comprises a block compressor 100. This block compressor 100 compresses the block(s) received from the image decomposer to generate compressed block representation(s). The overall size of the block representation is smaller than the corresponding size of the uncoded block. The block compressor 100 is preferably configured for processing (encoding) each block from the decomposer 22 sequentially.

In an alternative implementation, the compressor 20 includes multiple block compressor 100 for processing multiple blocks from the image decomposer 22 in parallel, which reduces the total image encoding time.

The units 22 and 100 of the image compressor 20 may be provided as software, hardware or a combination thereof. The units 22 and 100 may be implemented together in the image compressor 20. Alternatively, a distributed implementation is also possible with some of the units provided elsewhere in the image processing terminal.

Block Encoder

Figure 18:
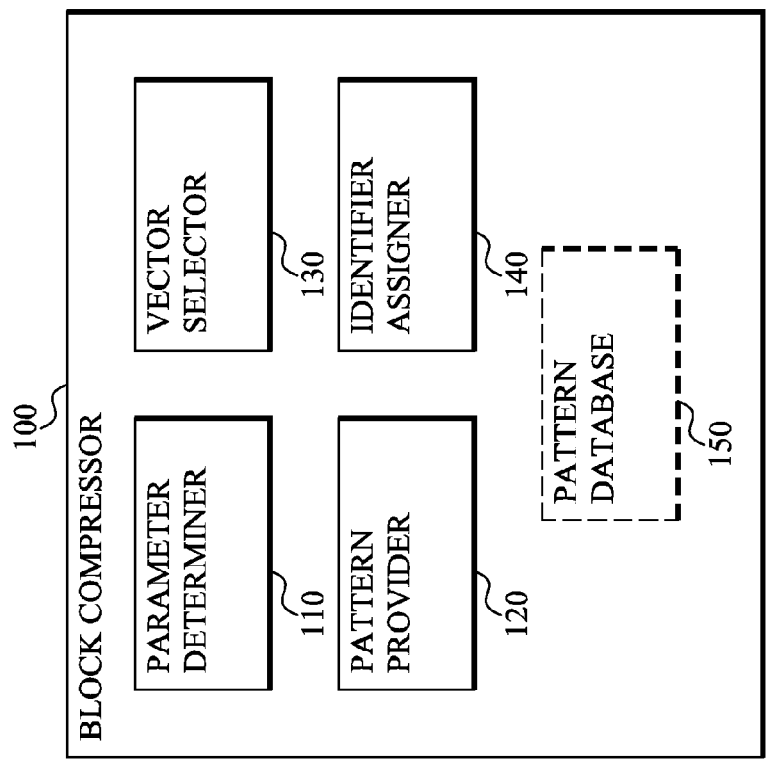
FIG. 18 is a block diagram of a block compressor according to an embodiment of the present invention.

FIG. 18 illustrates a block diagram of an embodiment of a block compressor 100 according to the present invention, such as the block compressor of the image compressor in FIG. 17. The compressor 100 comprises a parameter determiner 110 adapted to determine at least one parameter representative of a size of a bounding section in feature vector space. This determination is performed by defining the bounding section based on at least a portion of the feature vectors of the block. A size parameter, such as any of the previously described parameter embodiments, can then be determined by the parameter determiner based on the defined bounding section.

A pattern provider 120 is implemented in the compressor 100 for providing a deterministic, pseudo-random pattern of N multiple representation vectors encompassed by the bounding section in vector space. The provider 120 performs this pattern provision at least partly based on the at least one size parameter determined by the parameter determiner 110.

In a particular embodiment, the pattern provider 120 uses the determined size parameter(s) for retrieving a pre-calculated pseudo-random pattern from a connected pattern database 150. In such a case, the database comprises multiple different pseudo-random patterns of N multiple representation vectors, where each pattern is associated with an allowed range or value of the size parameter(s). The at least one size parameter therefore functions as a pattern identifier in the database 150, thereby relaxing the need for any on-the-fly pattern calculation during an actual block compression procedure by the compressor 100. The different patterns in the database 150 can previously have been generated by the pattern provider 120 as is discussed further herein. Alternatively, the patterns are generated by some other units and sent to the compressor 100 for entry into the database 150.

A vector selector 130 is implemented in the block compressor 100 for selecting, for at least one image element in the block, a vector among the N multiple representation vectors in the provided pattern. The selector 130 furthermore performs the selection based on the feature vector of the image element by preferably selecting the vector resulting in a smallest vector length of a difference vector between the feature vector and a vector among the representation vectors.

The block compressor 100 comprises an identifier assigner 140 arranged for assigning a vector identifier to the processed image element. This vector identifier is furthermore associated with and allows identification of the vector selected by the vector selector 130. The vector selector 130 and the identifier assigner 140 preferably selects vector and assigns vector identifier for each image element in the block to thereby obtain a compressed representation of the compressed block comprising representations of the size parameter and a sequence of vector identifiers.

The units 110 to 140 of the block compressor 100 may be provided as software, hardware or a combination thereof. The units 110 to 150 may be implemented together in the block compressor 100. Alternatively, a distributed implementation is also possible with some of the units provided elsewhere in the image compressor.

Figure 19:
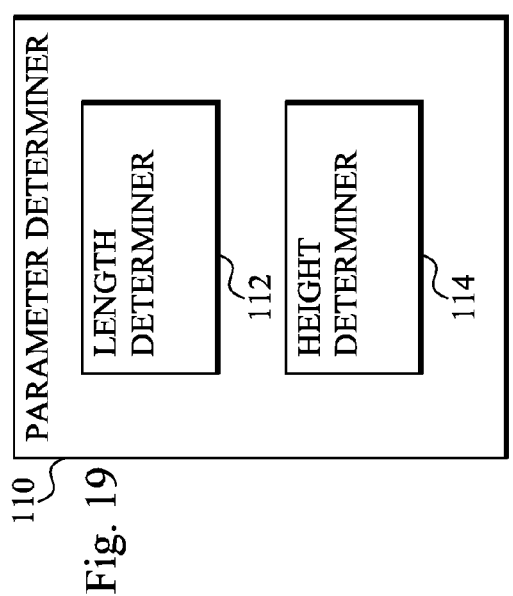
FIG. 19 is a block diagram of an embodiment of the parameter determiner of FIG. 18.

FIG. 19 is a schematic block diagram of an embodiment of the parameter determiner 110 in FIG. 18. The determiner 110 comprises a length determiner 112 arranged for determining a first size parameter representative of the length of the bounding section based on the compressed block. Thus, the length determiner 112 retrieves and possibly expands the sequences in the compressed block corresponding to $X_{min}$ and $X_{max}$. The length parameter is then calculated as difference between these two values, $\Delta X = X_{max} - X_{min}$.

A height determiner 114 is arranged for determining a second parameter representative of the height of the bounding section. This determiner 114 retrieves and possibly expands the bit sequences of the compressed block corresponding to $Y_{min}$ and $Y_{max}$ and calculates the height as a difference thereof, $\Delta Y = Y_{max} - Y_{min}$.

The units 112 and 114 of the parameter determiner 110 may be provided as software, hardware or a combination thereof. The units 112 and 114 may be implemented together in the parameter determiner 110. Alternatively, a distributed implementation is also possible with some of the units provided elsewhere in the block compressor.

Figure 20:
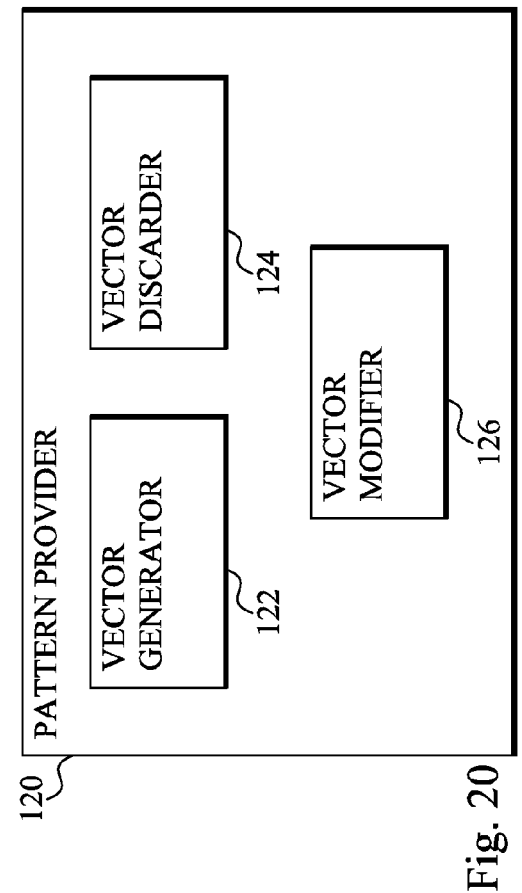
FIG. 20 is a block diagram of an embodiment of the pattern provider of FIG. 18.

FIG. 20 is a block diagram illustrating an embodiment of a pattern provider 120 of FIG. 18. The provider 120 comprises a deterministic, pseudo-random vector generator 122 that outputs a representation vector based on a seed input. The initial seed input of the generator 122 is the at least one size parameter of the parameter determiner. Subsequent seeds, if necessary, are the most previously output representation vector. It is anticipated by the invention that the vector generator 122 may handle the two (or three or more) vector components separately. In such a case, the generator 122 could have two instances of a pseudo-random function, one for outputting X-vector components and another for outputting Y-vector components.

A vector discarder 124 can be implemented in the pattern provider 120 for the purpose of investigating the candidate representation vectors from the vector generator 122. In such a case, the discarder 124 could investigate if the candidate vector is present inside the bounding section in vector space, otherwise it is discarded. In addition, or alternatively, the discarder 124 investigates the respective lengths of the distance vectors between the candidate vector and previously generated representation vectors. If any of the lengths is smaller than a minimum threshold, the candidate vector is discarded. As has been previously discussed, the vector discarder 124 could alternatively utilize one threshold value per vector component.

The pattern provider 120 may optionally also comprise a vector modifier adapted to iteratively move the representation vectors of the pattern to the mass-center of their respective Voronoi region as associated with the endpoints of the vectors.

In an alternative embodiment, the vector generator 122 first generates an initial representation vector based on the size parameter(s). A subsequent representation vector is generated to point towards a point on the circumference of a circle centered at the endpoint of a previously generated representation vector.

The vector discarder 124 could then, in addition to discarding vectors falling outside of the boundaries of the bounding section, also discard those representation vectors pointing towards a point encompassed by a circle centered at an endpoint of a previously generated representation vector.

The pattern provider 120 includes, in one embodiment, only the vector generator 122. In such a case, the generator 122 preferably uses a pseudo-random function/generator that has an inherent property of providing an efficient vector sampling over the whole area enclosed by the bounding section. An example includes a Poisson disc distribution. In another embodiment, the pattern provider 120 includes the vector generator 122 and at least one of the vector discarder 124 and the vector modifier 126.

The units 122 to 126 of the pattern provider 120 may be provided as software, hardware or a combination thereof. The units 122 to 126 may be implemented together in the pattern provider 120. Alternatively, a distributed implementation is also possible with some of the units provided elsewhere in the block compressor.

Image Decoder

FIG. 21 illustrates a block diagram of an embodiment of an image decompressor 30 according to the present invention. The image decompressor 30 preferably comprises a block selector 32 that is adapted for selecting, e.g. from a memory, which encoded block(s) that should be provided to a block decompressor 200 for decompression. The block selector 32 preferably receives input information associated with the compressed image data, e.g. from a header or a rendering engine. An address of a compressed block having the desired image element(s) is then computed based on the input information. This computed address is preferably dependent upon the image-element (pixel, texel or voxel) coordinates within an image. Using the address, the block selector 32 identifies the compressed block from the memory. This identified compressed image block is then fetched from the storage and provided to the block decompressor 200.

The (random) access to image elements of an image block advantageously enables selective decompression of only those portions of an image that are needed. Furthermore, the image can be decompressed in any order the data is required. For example, in texture mapping only portions of the texture may be required and these portions will generally be required in a non-sequential order. Thus, the image decompression of the present invention can with advantage by applied to process only a portion or section of an image.

The selected compressed block is then forwarded to the block decompressor 200. In addition to the image block, the decompressor 200 preferably receives information specifying which image elements of the block that should be decoded. The information could specify that the whole image block, i.e. all image elements therein, should be decoded. However, the received information could identify only a single or a few of the image elements that should be decoded. The block decompressor 200 then generates a decompressed representation of the image element(s) in the block.

An optional image composer 34 could be provided in the image decompressor 30. This composer receives the decoded image elements from the block decompressor 200 and composes them to generate a pixel that can be rendered or displayed on a screen. This image composer 34 could alternatively be provided in the graphic system.

Alternatively, the image decompressor 30 comprises multiple block decompressors 200. By having access to multiple block decompressors 200, the image decoder 30 can process multiple encoded image blocks in parallel. These multiple block decompressors 200 allow for parallel processing that increases the processing performance and efficiency of the image decompressor 30.

The units 32, 34 and 200 of the image decompressor 30 may be provided as software, hardware or a combination thereof. The units 32, 34 and 200 may be implemented together in the image decompressor 30. Alternatively, a distributed implementation is also possible with some of the units provided elsewhere in the user terminal.

Block Decoder

FIG. 22 is an illustration of an embodiment of a block decompressor or decoder 200 according to the present invention. The block decoder 200 comprises a parameter provider 210 arranged for providing at least one parameter representative of a size of a bounding section in feature vector space based on the compressed block. This parameter provision could be performed based on a simple bit sequence retrieval and optionally expanding the bit sequence to achieve a desired bit length. Alternatively, the parameter provider 210 furthermore processes the retrieved (and expanded) data for the purpose of calculating the at least one size parameter therefrom.

A pattern provider 220 is arranged in block decoder 200 for determining a deterministic, pseudo-random pattern of N multiple representation vectors based on the provided size parameter(s). This pattern provider 220 operates in a similar manner to the pattern provider of the block compressor described above and disclosed in FIG. 18. For instance, the pattern provider 220 can use the provided size parameter(s) as pattern identifier in a connected database 250 comprising multiple different pre-calculated patterns. Alternatively, the pattern provider generates the pattern on-the-fly based on the size parameter(s).

A vector selector 240 then selects which vector among the N representation vectors in the that is used as decoded representation of the original feature vector of an image element in the current block. This selection is performed based on a vector identifier included in the compressed block and associated with the image element.

The units 210 to 240 of the block decoder 200 may be provided as software, hardware or a combination thereof. The units 210 to 250 may be implemented together in the block decoder 200. Alternatively, a distributed implementation is also possible with some of the units provided elsewhere in the image decompressor.

FIG. 23 is a schematic block diagram of an embodiment of the pattern provider 220 of FIG. 22. The pattern provider comprises a vector generator 222 and optionally a vector discarder 224 and/or a vector modifier 226. The discussion above in connection with FIG. 20 applies mutatis mutandis to the operation of these units of the pattern provider 220.

The units 222 to 226 of the pattern provider 220 may be provided as software, hardware or a combination thereof. The units 222 to 226 may be implemented together in the pattern provider 220. Alternatively, a distributed implementation is also possible with some of the units provided elsewhere in the block decoder.

In the foregoing, the present invention has been described with reference of processing image blocks having normals, preferably normalized surface normals, as feature vectors. In an alternative implementation, the feature vectors could be a color vector in a color space, such as RGB (red, green, blue) space. Also other image element features that are representable as feature vectors in a feature vector space can be processed according to the present invention.

It will be understood by a person skilled in the art that various modifications and changes may be made to the present invention without departure from the scope thereof, which is defined by the appended claims.

REFERENCES

[1] http://www.ati.com/products/radeonx800/3DcWhitePaper.pdf ATI™ Radeon™ X800 3Dc™ White Paper
[2] U.S. Pat. No. 5,956,431

The invention claimed is:
1. A method of compressing a block of image elements, each image element having an associated feature vector, said method comprising the steps of:
   determining at least one parameter representative of a size of a bounding section in a feature vector space encompassing at least a portion of said feature vectors;
   utilizing said at least one parameter as initial seed for providing a deterministic, pseudo-random pattern of N multiple representation vectors encompassed by said bounding section in said feature vector space;
   selecting, for at least one image element and based on a feature vector associated with said image element, a representation vector from said N multiple representations vectors as a representation of said feature vector; and
   assigning, to said at least one image element, a vector identifier associated with said selected representation vector.

2. The method according to claim 1, wherein said determining step comprises the steps of:
   determining a first parameter representative of a length of said bounding section in said feature vector space; and
   determining a second parameter representative of a height of said bounding section in said feature vector space.

3. A method of decoding a feature vector representing an image feature of an image element from a compressed block, said method comprising the steps of:
   providing, based on said compressed block, at least one parameter representative of a size of a bounding section in a feature vector space;
   utilizing said at least one parameter as initial seed for providing a deterministic, pseudo-random pattern of N multiple representation vectors encompassed by said bounding section in said feature vector space; and
   selecting, based on a vector identifier associated with said image element and included in said compressed block, a vector from said N multiple representation vectors as a decoded representation of said feature vector.

4. The method according to claim 1, wherein said pattern providing step comprises the steps of:
   inputting the initial seed to a deterministic, pseudo-random function;
   outputting, from said function and based on said at least one parameter, a representation vector; and
   repeating said outputting step utilizing a previously output representation vector as seed input of said function to get said N multiple representation vectors.

5. The method according to claim 4, further comprising discarding said representation vector if said representation vector is not encompassed by said boundary box in said feature vector space.

6. The method according to claim 4, further comprising discarding said representation vector if said representation vector is within a predefined distance to a previously output representation vector.

7. The method according to claim 4, further comprising the step of iteratively moving said representation vector to a mass-center of a Voronoi region associated with an end point of said representation vector.

8. The method according to claim 1, wherein said pattern providing step comprises the steps of:
   a) randomly providing a representation vector;
   b) discarding said representation vector of said a) if said representation vector of step a) is not encompassed by said bounding section in said feature vector space as determined based on said at least one parameter;
   c) randomly providing a representation vector pointing towards a point on the circumference of circle centered at an end point of a previously provided representation vector;
   d) discarding said representation vector of step c) if said representation vector of step c) is not encompassed by said bounding section in said feature vector space as determined based on said at least one parameter; and
   e) repeating said providing step c) and said discarding step d) to get said N multiple representation vectors.

9. The method according to claim 1, wherein said pattern providing step comprises providing, based on said initial seed, said deterministic, pseudo-random pattern of N multiple representation vectors from a database comprising multiple different deterministic, pseudo-random patterns of N multiple representation vectors and each pattern is associated with an allowed range of said initial seed.

10. A computer program product, comprising instructions stored on a non-transitory computer readable storage medium which, when executed by a computer, perform the steps of claim 1.

11. A compressor for compressing a block of image elements, each image element having an associated feature vector, said compressor comprising:
   a parameter determiner adapted to determine at least one parameter representative of a size of a bounding section in a feature vector space encompassing at least a portion of said feature vectors;
   a pattern provider adapted to utilize said at least one parameter as initial seed to provide a deterministic, pseudo-random pattern of N multiple representation vectors encompassed by said bounding section in said feature vector space;
   a vector selector adapted to select, for at least one image element and based on a feature vector associated with said image element, a representation vector from said N multiple representations vectors as a representation of said feature vector; and
   an identifier assigner adapted to assign, to said at least one image element, a vector identifier associated with said selected representation vector, wherein the parameter determiner, pattern provider, vector selector, and identifier assigner are implemented by a computer.

12. The compressor according to claim 11, wherein said parameter determiner comprises:
   a length determiner adapted to determine a first parameter representative of a length of said bounding section in said feature vector space; and
   a height determiner adapted to determine a second parameter representative of a height of said bounding section said feature vector space.

13. A decoder for decoding a feature vector representing an image feature of an image element from a compressed block, said decoder comprising:
   a parameter provider adapted to provide, based on said compressed block, at least one parameter representative of a size of a bounding section in a feature vector space;
   a pattern provider adapted to utilize said at least one parameter as initial seed to provide a deterministic, pseudo-random pattern of N multiple representation vectors encompassed by said bounding section in said feature vector space; and
   a vector selector adapted to select, based on a vector identifier associated with said image element and included in said compressed block, a vector from said N multiple representation vectors as a decoded representation of said feature vector; wherein the parameter provider, pattern provider, and vector selector are implemented by a computer.

14. The decoder according to claim 11, wherein said pattern provider comprises a deterministic, pseudo-random vector generator utilizing initial seed as input and outputting, based at least partly on said initial seed said N multiple representation vectors.

15. The decoder according to claim 14, wherein said pattern provider further comprising a vector discarder adapted to discard a representation vector output from said vector generator if said representation vector is not encompassed by said boundary box in said feature vector space.

16. The decoder according to claim 14, wherein said pattern provider further comprising a vector discarder adapted to discard a representation vector output from said vector generator if said representation vector is within a predefined distance to a previously output representation vector.

17. The decoder according to claim 14, wherein said pattern provider further comprising a vector modifier adapted to iteratively move a representation vector output from said vector generator to a mass-center of a Voronoi region associated with an end point of said representation vector.

18. The decoder according to claim 11, wherein said pattern provider comprises:
   a deterministic, pseudo-random vector generator adapted to i) generate an initial representation vector using said initial seed as input and ii) adapted to generate N−1 additional representation vectors, where each representation vector points towards a point on the circumference of a circle centered at an end point of a previously generated representation vector; and
   a vector discarder adapted to discard a representation vector generated by said vector generator if said representation vector is not encompassed by said bounding section in said feature vector space as determined based on said at least one parameter.

19. The decoder according to claim 18, wherein said vector discarder is also adapted to discard said representation vector generated by said vector generator if said representation vector points towards a point encompassed by a circle centered at an end point of a previously generated representation vector.

20. The decoder according to claim 11, wherein said pattern provider is adapted to provide, based on said initial seed, said deterministic, pseudo-random pattern of N multiple representation vectors from a database comprising multiple different deterministic, pseudo-random patterns of N multiple representation vectors and each pattern is associated with an allowed range of said initial seed.

\* \* \* \* \*

UNITED STATES PATENT AND TRADEMARK OFFICE
CERTIFICATE OF CORRECTION

PATENT NO. : 8,571,339 B2  
APPLICATION NO. : 12/594628  
DATED : October 29, 2013  
INVENTOR(S) : Strom Page 1 of 1

It is certified that error appears in the above-identified patent and that said Letters Patent is hereby corrected as shown below:

In the Specification:

In Column 6, Line 9, delete "thereform," and insert -- therefrom, --, therefor.

In Column 6, Line 35, delete "step 82" and insert -- step S2 --, therefor.

In the Claims:

In Column 21, Line 47, in Claim 8, delete "said a)" and insert -- step a) --, therefor.

In Column 22, Line 1, in Claim 10, delete "product, comprising" and insert -- product comprising --, therefor.

In Column 22, Line 24, in Claim 11, delete "vector, wherein" and insert -- vector; wherein --, therefor.

Signed and Sealed this  
Twenty-ninth Day of July, 2014

Michelle K. Lee  
*Deputy Director of the United States Patent and Trademark Office*